United States Patent
Kim et al.

(10) Patent No.: US 10,771,244 B2
(45) Date of Patent: Sep. 8, 2020

(54) METHOD FOR COMMUNICATION BETWEEN DEVICES AND DEVICES THEREOF

(71) Applicant: SAMSUNG ELECTRONICS CO., LTD., Suwon-si (KR)

(72) Inventors: Se-il Kim, Seongnam-si (KR); Dong-chan Kim, Seoul (KR); Mi-suk Huh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 132 days.

(21) Appl. No.: 15/747,184

(22) PCT Filed: Jul. 18, 2016

(86) PCT No.: PCT/KR2016/007787
§ 371 (c)(1),
(2) Date: Jan. 24, 2018

(87) PCT Pub. No.: WO2017/018708
PCT Pub. Date: Feb. 2, 2017

(65) Prior Publication Data
US 2018/0227279 A1 Aug. 9, 2018

(30) Foreign Application Priority Data
Jul. 29, 2015 (KR) .................. 10-2015-0107517

(51) Int. Cl.
*H04L 29/06* (2006.01)
*H04W 12/02* (2009.01)
(Continued)

(52) U.S. Cl.
CPC .......... *H04L 9/0825* (2013.01); *H04L 9/0869* (2013.01); *H04L 9/14* (2013.01);
(Continued)

(58) Field of Classification Search
None
See application file for complete search history.

(56) References Cited

U.S. PATENT DOCUMENTS 6,009,174 A * 12/1999 Tatebayashi ......... H04N 7/1675
380/277
6,351,536 B1 * 2/2002 Sasaki .................. G06F 21/606
380/255

(Continued)

FOREIGN PATENT DOCUMENTS

CN 102064858 A 5/2011
EP 1 335 563 A2 8/2003
(Continued)

OTHER PUBLICATIONS

R. Pugazendi, A secured model for trusted communication in network using Zero Interaction Authentication, 2008 3rd International Conference on Sensing Technology (pp. 374-3780 (Year: 2008).*

(Continued)

*Primary Examiner* — Luu T Pham
*Assistant Examiner* — Chao Wang
(74) *Attorney, Agent, or Firm* — Sughrue Mion, PLLC

(57) ABSTRACT

Disclosed is a method of performing, by a first device, short-range wireless communication with a second device, the method including receiving, from the second device, second authentication information encrypted using first authentication information of the first device, decrypting the encrypted second authentication information by using the first authentication information, determining a secret key based on the decrypted second authentication information, and performing communication between the first device and the second device by using the determined secret key.

11 Claims, 16 Drawing Sheets

(51) Int. Cl.
*H04W 4/70* (2018.01)
*H04W 4/80* (2018.01)
*H04L 9/14* (2006.01)
*H04L 9/08* (2006.01)
*H04W 12/04* (2009.01)
*H04W 12/06* (2009.01)
*H04W 12/00* (2009.01)

(52) U.S. Cl.
CPC .......... *H04L 63/0442* (2013.01); *H04L 63/06* (2013.01); *H04L 63/061* (2013.01); *H04W 4/70* (2018.02); *H04W 4/80* (2018.02); *H04W 12/0013* (2019.01); *H04W 12/0401* (2019.01); *H04W 12/04033* (2019.01); *H04W 12/0609* (2019.01); *H04L 2209/80* (2013.01)

(56) References Cited

U.S. PATENT DOCUMENTS

| | | | |
|---|---|---|---|
| 6,385,318 B1 * | 5/2002 | Oishi | H04L 9/3073 380/262 |
| 8,295,489 B2 | 10/2012 | Sung et al. | |
| 8,477,948 B2 | 7/2013 | Shon et al. | |
| 9,055,441 B2 | 6/2015 | Lee et al. | |
| 9,205,336 B1 * | 12/2015 | Yano | A63F 13/20 |
| 2003/0149874 A1 | 8/2003 | Balfanz et al. | |
| 2004/0086124 A1 * | 5/2004 | Sasaki | H04L 9/0833 380/277 |
| 2007/0136587 A1 * | 6/2007 | Shvodian | H04L 9/3247 713/169 |
| 2007/0177725 A1 * | 8/2007 | Jung | H04L 9/302 380/30 |
| 2007/0208668 A1 * | 9/2007 | Candelore | G06Q 20/3829 705/57 |
| 2007/0282749 A1 * | 12/2007 | Nonaka | G11B 20/00086 705/51 |
| 2008/0022089 A1 * | 1/2008 | Leedom | H04L 63/068 713/156 |
| 2009/0177889 A1 * | 7/2009 | Sung | H04L 63/061 713/171 |
| 2009/0214037 A1 * | 8/2009 | Tuttle | H04Q 9/00 380/270 |
| 2012/0030466 A1 * | 2/2012 | Yamaguchi | H04L 9/0841 713/168 |
| 2013/0156191 A1 * | 6/2013 | Lim | G06K 19/0723 380/270 |
| 2014/0052992 A1 * | 2/2014 | Nozulak | H04L 63/0428 713/171 |
| 2014/0310515 A1 * | 10/2014 | Kim | G09C 1/00 713/155 |
| 2015/0271667 A1 * | 9/2015 | Bernsen | H04L 63/06 713/171 |
| 2015/0358814 A1 * | 12/2015 | Roberts | H04W 12/06 713/169 |
| 2017/0208045 A1 * | 7/2017 | Huh | H04L 63/0428 |
| 2018/0227279 A1 | 8/2018 | Kim et al. | |

FOREIGN PATENT DOCUMENTS

| | | |
|---|---|---|
| KR | 10-1998-033371 A | 7/1998 |
| KR | 10-2006-0077808 A | 7/2006 |
| KR | 10-2011-0054737 A | 5/2011 |
| KR | 10-2011-0082366 A | 7/2011 |
| KR | 10-2013-0067134 A | 6/2013 |
| KR | 10-1413376 B1 | 7/2014 |
| WO | 2007/111713 A2 | 10/2007 |
| WO | 2017/018708 A1 | 2/2017 |

OTHER PUBLICATIONS

Jun Liu, Privacy-Preserving Quick Authentication in Fast Roaming Networks, Proceedings. 2006 31st IEEE Conference on Local Computer Networks (pp. 975-982) (Year: 2006).*

N. El-Fishway, On the design of authentication protocols for third generation mobile communication systems, Proceedings of the Twentieth National Radio Science Conference (NRSC'2003) (IEEE Cat. No. 03EX665) (p. C24-1) (Year: 2003).*

Communication dated Nov. 14, 2019, issued by the Korean Intellectual Property Office in corresponding Korean Application No. 10-2015-0107517.

Communication issued by the International Searching Authority on Oct. 14, 2016 in counterpart International Application No. PCT/KR2016/007787 (PCT/ISA/210 & PCT/ISA/237).

Communication dated Jun. 3, 2020 by the State Intellectual Property Office of P.R. China in counterpart Chinese Patent Application No. 201680044258.9.

* cited by examiner

METHOD FOR COMMUNICATION BETWEEN DEVICES AND DEVICES THEREOF

TECHNICAL FIELD

The present disclosure relates to communication methods between devices, devices communicating with each other, and recording media having recorded thereon programs for executing the methods.

BACKGROUND ART

The Internet is evolving from a human-centered network, in which humans create and use data, to the Internet of things (IoT), in which data is exchanged and processed among distributed elements such as objects. The Internet of everything (IoE) technology, in which big data processing technology based on connection with a cloud server or the like is combined with the IoT technology, is on the rise. Since technology elements such as sensing technology, wired/wireless communication and network infra, service interface technology, and security technology are required to implement the IoT, research is currently being conducted on sensor network, machine to machine (M2M), and machine type communication (MTC) technologies for connection among objects.

DETAILED DESCRIPTION OF THE INVENTION

Technical Problem

Provided are methods of securely and efficiently sharing information required to establish a communication channel between a device which desires to participate in a short-range wireless communication network and a device which relays the network.

Technical Solution

According to an aspect of an embodiment, a method of performing, by a first device, short-range wireless communication with a second device includes receiving, from the second device, second authentication information encrypted using first authentication information of the first device, decrypting the encrypted second authentication information by using the first authentication information, determining a secret key based on the decrypted second authentication information, and performing communication between the first device and the second device by using the determined secret key.

BEST MODE

Figure 1:
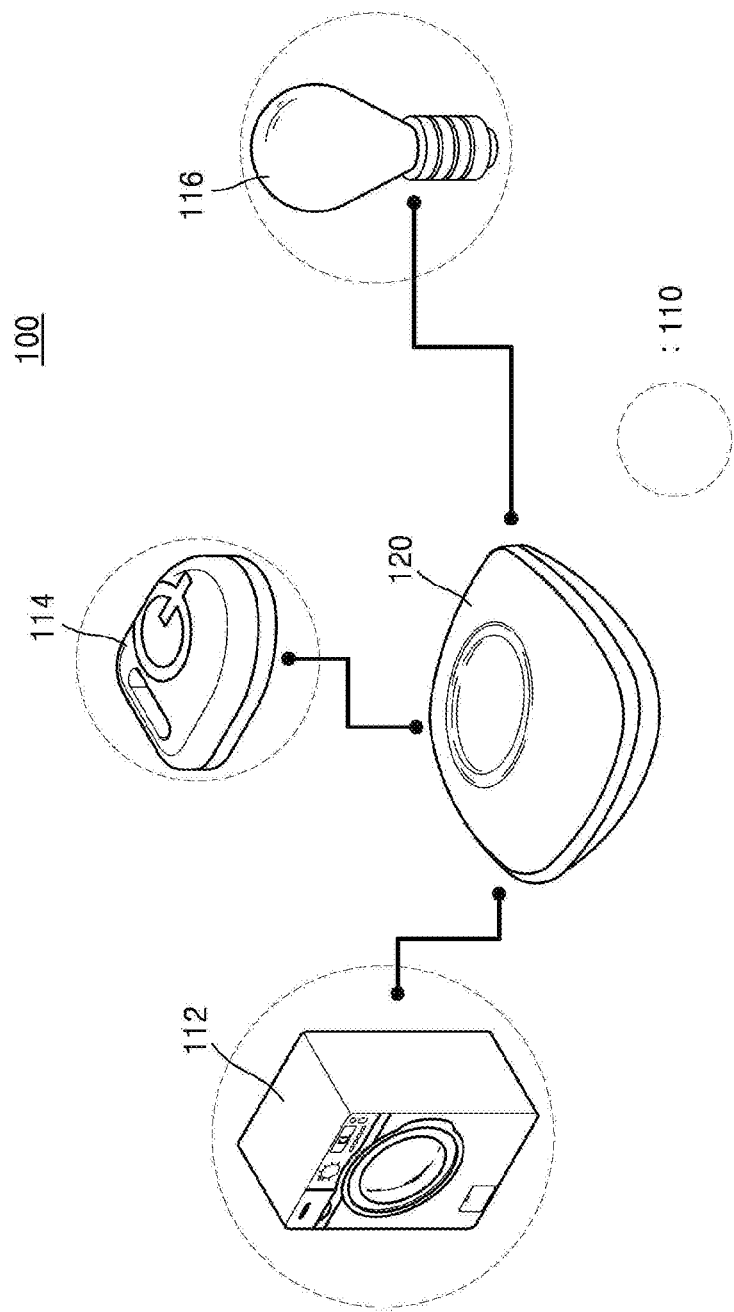
FIG. 1 is a schematic diagram of a communication system according to an embodiment.

According to an aspect of an embodiment, a method of performing, by a first device, short-range wireless communication with a second device includes receiving, from the second device, second authentication information encrypted using first authentication information of the first device, decrypting the encrypted second authentication information by using the first authentication information, determining a secret key based on the decrypted second authentication information, and performing communication between the first device and the second device by using the determined secret key.

The first authentication information and the second authentication information may include a first public key generated by the first device and a second public key generated by the second device, respectively, and the method may further include transmitting the first public key to the second device The method may further include generating the first public key by using a random number.

The receiving of the second authentication information may include receiving identification information of the second device together with the encrypted second authentication information.

The determining of the secret key may include generating the secret key based on at least one of the first authentication information, the second authentication information, identification information of the first device, and the identification information of the second device, and the performing of communication between the first device and the second device may include decrypting an encrypted network key received from the second device, by using the generated secret key.

The second authentication information may include security information generated by the second device, and the determining of the secret key may include selecting at least one of a plurality of secret keys included in the decrypted security information.

The performing of communication between the first device and the second device may include establishing an encrypted communication channel between the first device and the second device by using the determined secret key.

According to an aspect of another embodiment, a method of performing, by a second device, short-range wireless communication with a first device includes receiving first authentication information from the first device, encrypting second authentication information based on the received first authentication information, transmitting the encrypted second authentication information to the first device, and performing communication between the first device and the second device as the encrypted second authentication information is decrypted by the first device.

The receiving of the first authentication information may include receiving a first public key generated by the first device, and the encrypting of the second authentication information may include encrypting a second public key by using the received first public key.

The receiving of the first authentication information may include receiving identification information of the first device together with the first authentication information.

The method may further include generating a secret key based on at least one of the first authentication information, the second authentication information, the identification information of the first device, and identification information of the second device, encrypting a network key by using the generated secret key, and transmitting the encrypted network key to the first device.

The second authentication information may include a plurality of secret keys, the performing of communication between the first device and the second device may include receiving at least one secret key selected by the first device, and determining whether the received at least one secret key is included in the plurality of secret keys.

The performing of communication between the first device and the second device may include establishing an encrypted communication channel between the first device and the second device by using the determined secret key.

According to an aspect of another embodiment, a first device for performing short-range wireless communication with a second device includes a communication unit configured to receive, from the second device, second authentication information encrypted using first authentication information, and a processor configured to decrypt the encrypted second authentication information by using the first authentication information, and determine a secret key based on the decrypted second authentication information, wherein the communication unit is further configured to perform communication between the first device and the second device by using the determined secret key.

The first authentication information and the second authentication information may include a first public key generated by the first device and a second public key generated by the second device, respectively, and the communication unit may be further configured to transmit the first public key to the second device.

The processor may be further configured to generate the first public key by using a random number.

The communication unit may be further configured to receive identification information of the second device together with the encrypted second authentication information.

The processor may be further configured to generate the secret key based on at least one of the first authentication information, the second authentication information, identification information of the first device, and the identification information of the second device, and decrypt an encrypted network key received from the second device, by using the generated secret key.

The second authentication information may include security information generated by the second device, and the processor may be further configured to select at least one of a plurality of secret keys included in the decrypted security information.

The processor may be further configured to establish an encrypted communication channel between the first device and the second device by using the determined secret key.

According to an aspect of another embodiment, a second device for performing short-range wireless communication with a first device includes a communication unit configured to receive first authentication information from the first device, and a processor configured to encrypt second authentication information based on the received first authentication information, wherein the communication unit is configured to transmit the encrypted second authentication information to the first device and perform communication between the first device and the second device as the encrypted second authentication information is decrypted by the first device.

The communication unit may be further configured to receive a first public key generated by the first device, and the processor may be further configured to encrypt a second public key by using the received first public key.

The communication unit may be further configured to receive identification information of the first device together with the first authentication information.

The processor may be further configured to generate a secret key based on at least one of the first authentication information, the second authentication information, the identification information of the first device, and identification information of the second device, and encrypt a network key by using the generated secret key, and the communication unit may be further configured to transmit the encrypted network key to the first device.

The second authentication information may include a plurality of secret keys.

The communication unit (or interface) may be further configured to receive at least one secret key selected by the first device, and the processor may be further configured to determine whether the received at least one secret key is included in the plurality of secret keys.

The processor may be further configured to establish an encrypted communication channel between the first device and the second device by using the determined secret key.

MODE OF THE INVENTION

Terminology used in this specification will now be briefly described before describing embodiments.

Although the terms used in the following description are selected, as much as possible, from general terms that are widely used at present while taking into consideration the functions obtained in accordance with the embodiments, these terms may be replaced by other terms based on intentions of one of ordinary skill in the art, customs, emergence of new technologies, or the like. In a particular case, terms that are arbitrarily selected by the applicant may be used. In this case, the meanings of these terms may be described in corresponding parts of the embodiments. Accordingly, it should be noted that the terms used herein should be construed based on practical meanings thereof and the whole content of this specification, rather than being simply construed based on names of the terms.

It will be understood that the terms "comprises", "comprising", "includes" and/or "including", when used herein, specify the presence of stated elements, but do not preclude the presence or addition of one or more other elements. The suffix such as " . . . er", "unit", or "module" is used to denote an entity for performing at least one function or operation, and may be embodied in the form of hardware, software, or a combination thereof.

Reference will now be made in detail to embodiments, examples of which are illustrated in the accompanying drawings, wherein like reference numerals refer to like elements throughout. In the following description, for clarity, parts or elements that are not related to the embodiments are omitted. In this regard, the present embodiments may have different forms and should not be construed as being limited to the descriptions set forth herein. Accordingly, the embodiments are merely described below, by referring to the figures, to explain aspects.

FIG. 1 is a schematic diagram of a communication system 100 according to an embodiment.

The communication system 100 according to an embodiment may include at least one first device 110 (e.g., 112, 114, or 116) and a second device 120.

FIG. 1 illustrates only elements of the communication system 100 related to the current embodiment. Therefore, one of ordinary skill in the art related to the current embodiment will understand that the communication system 100 may further include other general-use elements in addition to the elements illustrated in FIG. 1. For example, the communication system 100 illustrated in FIG. 1 may further include other devices in addition to the plurality of devices 112, 114, 116, and 120.

The first device 110 may be a device having a communication function capable of participating in a short-range network. For example, referring to FIG. 1, the at least one first device 110 may be an Internet of things (IoT) device having a communication function, e.g., a washing machine 112, a CD player 114, or a light bulb 116. The above-mentioned devices are merely examples and, in the present disclosure, the first device 110 may be one of devices having a communication module capable of implementing a communication technology based on a short-range network.

The first device 110 according to an embodiment may encrypt and decrypt various types of information required to establish a communication channel. For example, in order for the first device 110 to participate in a short-range network of the second device 120, exchange of a network key may be required.

The first device 110 may receive, from the second device 120, a network key encrypted based on first authentication information and second authentication information of the first device 110. The first device 110 may decrypt the encrypted network key by using the first authentication information. Herein, the first authentication information and the second authentication information may be determined based on an encryption protocol performed between the first device 110 and the second device 120. For example, a public key, security card information, and random number information may be included in the authentication information.

However, the network key is merely an example and a parameter or data transmitted/received to establish a communication channel between the first device 110 and the second device 120 may be encrypted and decrypted in various manners.

The second device 120 may be a device for relaying network connection in such a manner that the at least one first device 110 capable of short-range wireless communication participates in a network. For example, the second device 120 may include at least one of a hub device, gateway device, and router device. However, the above-mentioned devices are merely examples and the present disclosure is not limited thereto.

The second device 120 according to an embodiment may encrypt and decrypt various types of information required to establish a communication channel.

For example, the second device 120 may encrypt at least one of the second authentication information and the network key required to establish a communication channel, by using the first authentication information received from the first device 110. In addition, the second device 120 may decrypt encrypted information received from the first device 110.

Figure 2:
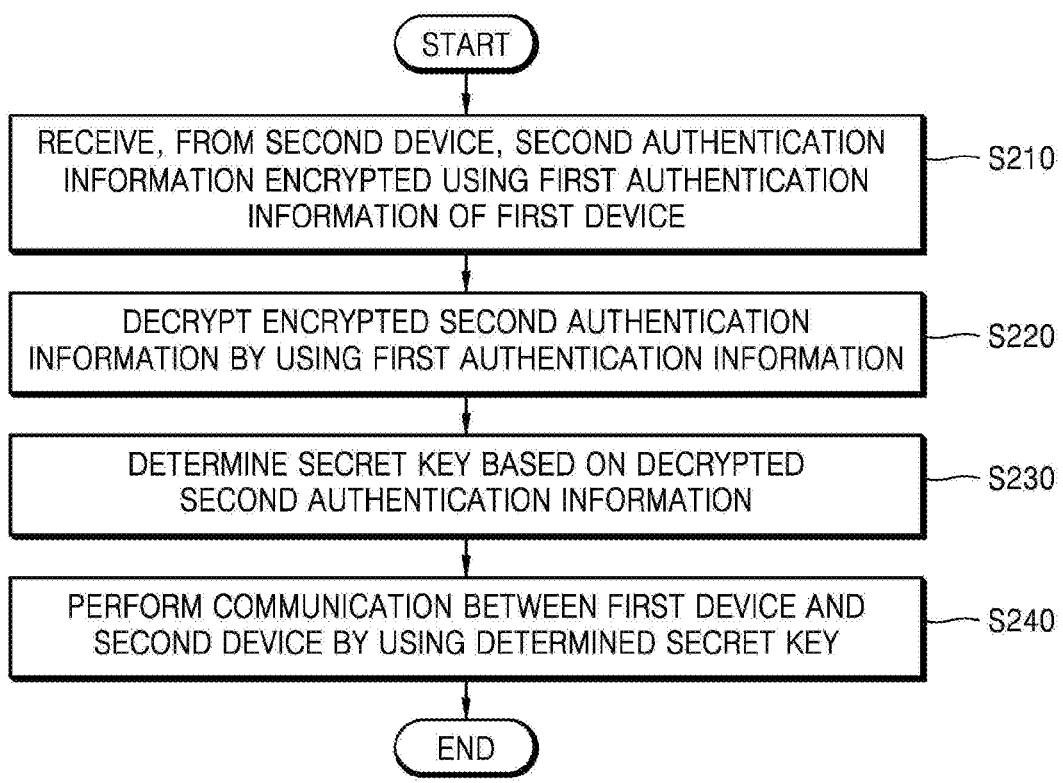
FIG. 2 is a flowchart of a method of communicating with a second device by a first device, according to an embodiment.

FIG. 2 is a flowchart of a method of communicating with the second device 120 by the first device 110, according to an embodiment.

In operation S210, the first device 110 receives, from the second device 120, second authentication information encrypted using first authentication information of the first device 110. Herein, the first authentication information may include at least one of identification information of the first device 110, a public key, a random variable generated by the first device 110, etc. However, the above-mentioned types of information are merely examples and the present disclosure is not limited thereto.

The first device 110 according to an embodiment may transmit the first authentication information and a participation request to the second device 120 in order to participate in a short-range network relayed by the second device 120. The first authentication information may be used when the second device 120 encrypts the second authentication information.

In operation S220, the first device 110 decrypts the encrypted second authentication information by using the first authentication information.

The first device 110 according to an embodiment may receive, from the second device 120, the second authentication information encrypted using the first authentication information. Herein, the second authentication information may include at least one of identification information of the second device 120, a public key, random information generated by the second device 120, etc.

Herein, information about a function used to encrypt or decrypt the authentication information between the first device 110 and the second device 120 may be equally preset for the first device 110 and the second device 120.

In operation S230, the first device 110 determines a secret key based on the decrypted second authentication information.

The decrypted second authentication information according to an embodiment may be the public key of the second device 120. Alternatively, the decrypted second authentication information may be security information including key values randomly generated by the second device 120.

For example, the first device 110 may generate the secret key by using the first authentication information and the second authentication information. Herein, the secret key may be used to encrypt a network key used to establish a communication channel between the first device 110 and the second device 120.

According to another embodiment, the decrypted second authentication information may be a security key included in a security card generated by the second device 120. The first device 110 may select at least one security key from the security card.

In operation S240, the first device 110 performs communication between the first device 110 and the second device 120 by using the determined secret key.

The first device 110 according to an embodiment may receive, from the second device 120, the network key encrypted using the determined secret key. The first device 110 may decrypt the encrypted network key by using the determined secret key. Since the first device 110 and the second device 120 exchange the encrypted network key, unauthorized devices may be prevented from participating in the network relayed by the second device 120. In addition, the The first device 110 according to another embodiment may transmit the determined secret key to the second device 120. When the determined secret key equals a secret key of the second device 120, the first device 110 may participate in the network relayed by the second device 120.

Figure 3:
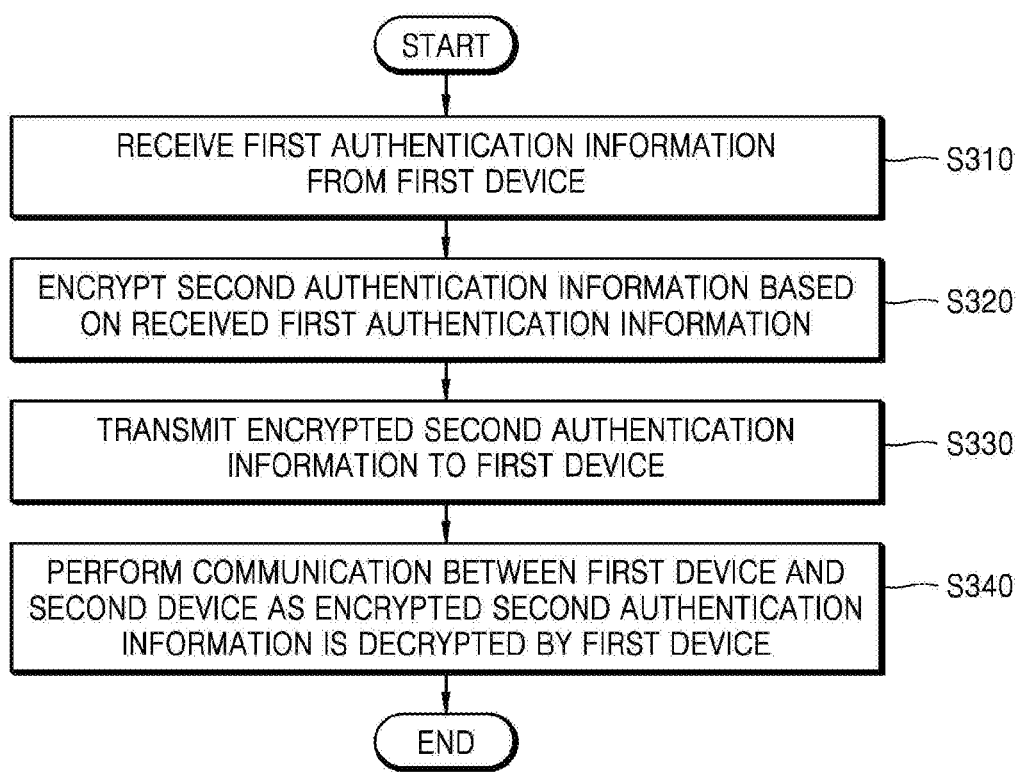
FIG. 3 is a flowchart of a method of communicating with the first device by the second device, according to an embodiment.

FIG. 3 is a flowchart of a method of communicating with the first device 110 by the second device 120, according to an embodiment.

In operation S310, the second device 120 receives first authentication information from the first device 110.

The second device 120 according to an embodiment may receive, from the first device 110, the first authentication information and a participation request for participating in a network relayed by the second device 120. The participation request of the first device 110 may include the first authentication information. Alternatively, the second device 120 may receive the participation request and the first authentication information of the first device 110 as separate signals.

Herein, as described above in relation to FIG. 2, the first authentication information may include at least one of identification information of the first device 110, a public key, a random variable generated by the first device 110, etc. However, the above-mentioned types of information are merely examples and the present disclosure is not limited thereto.

In operation S320, the second device 120 encrypts second authentication information based on the received first authentication information. Herein, an encryption scheme used to encrypt the second authentication information may be pre-shared between the first device 110 and the second device 120.

Herein, the second authentication information may include at least one of identification information of the second device 120, a public key, random information generated by the second device 120, etc.

When a first public key of the first device 110 is received as the first authentication information, the second device 120 according to an embodiment may encrypt the first public key by using a private key of the second device 120, e.g., a second private key.

When a random number generated by the first device 110 is received as the first authentication information, the second device 120 according to another embodiment may encrypt the received random number by using a key generation function. For example, the second device 120 may generate security information including a plurality of security keys, by using the key generation function and the received random number.

In operation S330, the second device 120 transmits the encrypted second authentication information to the first device 110.

The second device 120 according to an embodiment may transmit an encrypted second public key to the first device 110. Alternatively, the second device 120 may transmit encrypted security information to the first device 110.

In operation S340, the second device 120 performs communication between the first device 110 and the second device 120 as the encrypted second authentication information is decrypted by the first device 110.

The second device 120 according to an embodiment may generate a secret key by using the first authentication information and the second authentication information. The second device 120 may encrypt a network key by using a master key. When the first device 110 is owned by a pre-authorized user, the first device 110 may decrypt the encrypted network key by using a master key generated based on information exchanged with the second device 120. Since the second device 120 encrypts the network key for communication, unauthorized devices other than the first device 110 may be prevented from participating in a communication channel.

The first device 110 according to another embodiment may transmit a determined secret key to the second device 120. Herein, the determined secret key may be an arbitrary security key included in a security card of the second device 120 and determined by the first device 110.

Figure 4:
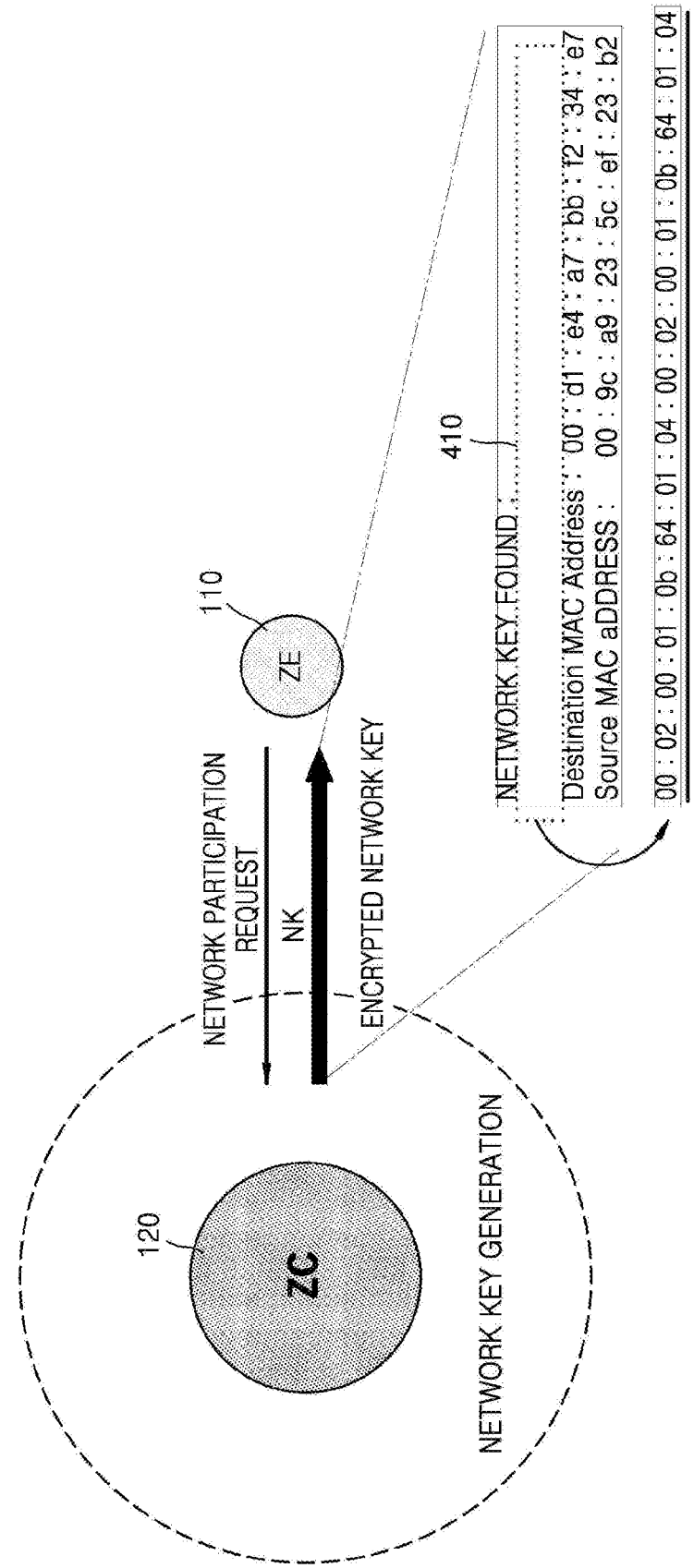
FIG. 4 is a conceptual diagram for describing a communication method between the first device and the second device based on a public key exchange protocol, according to an embodiment.

FIG. 4 is a conceptual diagram for describing a communication method between the first device 110 and the second device 120 based on a public key exchange protocol, according to an embodiment.

The first device 110 may transmit a participation request for participating in a network of the second device 120. Herein, the first device 110 may be one of devices having a communication module capable of participating in the network. For example, the first device 110 may be a smartphone, laptop computer, tablet PC, electronic book device, digital broadcast receiver, personal digital assistant (PDA), portable multimedia player (PMP), navigation system, smart TV, consumer electronics (CE) device (e.g., a refrigerator or air conditioner having a display panel), or the like, but is not limited thereto.

The second device 120 may control data transmission/reception of other devices connected to the network. In addition, the second device 120 may determine whether to permit participation of another device, which desired to participate in the network. For example, the second device 120 may be a router, gateway, or hub but is not limited thereto. Herein, the network may be a Zigbee network, Bluetooth network, or the like based on short-range wireless communication. The following description will be focused on a communication method between the first device 110 and the second device 120 in a Zigbee network for convenience of explanation. However, the embodiments are not limited to the Zigbee network.

The first device 110 according to an embodiment may generate a secret key by exchanging a public key with the second device 120. A network key 410 encrypted using the secret key may be transmitted/received between the first device 110 and the second device 120. For example, the second device 120 may encrypt the network key by using the secret key and provide the same to the first device 110.

According to an embodiment, since the network key encrypted using the secret key is transmitted/received, other unauthorized external devices may be prevented from participating in the network.

The secret key for encrypting the network key may be determined based on an input parameter and an encryption function type. For example, the input parameter may include at least one of an iteration count, random value, nonce, use of heterogeneous hash functions, and time stamp. The encryption function type may indicate a hash function, message authentication code (MAC), or block cipher. However, the above-mentioned functions are merely examples and the encryption function type is not limited thereto.

Figure 5:
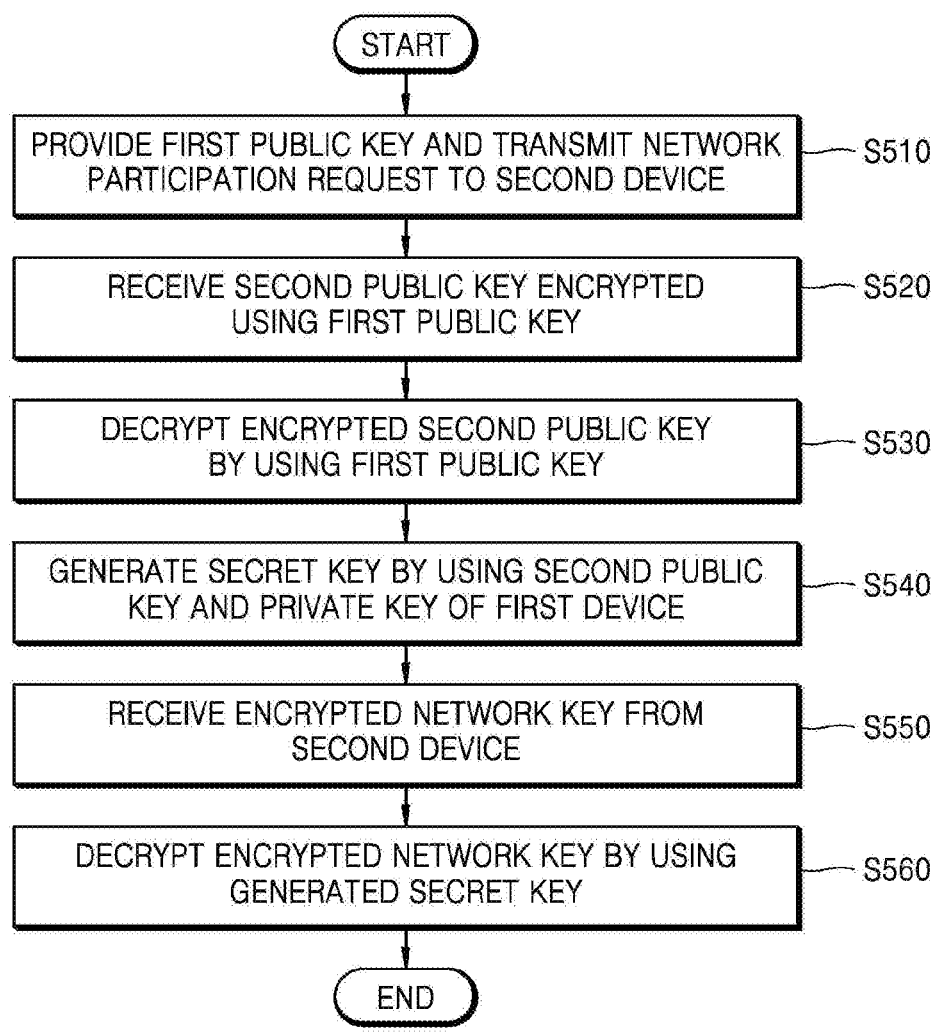
FIG. 5 is a flowchart of a method of communicating with the second device by the first device based on a public key exchange protocol, according to an embodiment.

FIG. 5 is a flowchart of a method of communicating with the second device 120 by the first device 110 based on a public key exchange protocol, according to an embodiment.

In operation S510, the first device 110 may provide a first public key and transmit a network participation request to the second device 120.

The first device 110 according to an embodiment may transmit the network participation request for participating in a Zigbee network relayed by the second device 120. Herein, the network participation request may include identification information of the first device 110 and the first public key of the first device 110. However, the network participation request including the first public key is merely an example and the first device 110 may provide the network participation request and the first public key to the second device 120 as separate messages.

The first public key may be generated based on a first private key of the first device 110. The first device 110 may generate the first private key by generating an arbitrary random number. For example, the first device 110 may generate a random number a to generate the first private key. The first device 110 may generate the first public key by applying a preset function to the first private key. For example, the first device 110 may generate a first public key aP by multiplying the random number a by a preset value P.

In operation S520, the first device 110 may receive a second public key of the second device 120, which is encrypted using the first public key.

As the first public key is received from the first device 110, the second device 120 according to an embodiment may encrypt the second public key by using the first public key. The second device 120 may transmit the encrypted second public key to the first device 110. Herein, the second device 120 may encrypt the second public key by using the first public key and a credential pre-shared between the first device 110 and the second device 120. Herein, the credential is cryptographic information capable of indicating an authorized first device, and may be pre-shared between the authorized first device and the second device 120.

In operation S530, the first device 110 may decrypt the encrypted second public key by using the first public key.

The first device 110 according to an embodiment may decrypt the encrypted second public key by using pre-stored authentication information and the first public key.

In operation S540, the first device 110 may generate a secret key by using the second public key and the first private key.

The first device 110 according to an embodiment may generate the secret key based on at least one of the first private key, the second public key, the identification information of the first device 110, and identification information of the second device 120.

Herein, the types of information used to generate the secret key may be preset between the first device 110 and the second device 120.

In operation S550, the first device 110 may receive an encrypted network key from the second device 120.

The second device 120 according to an embodiment may generate a secret key for encrypting the network key required for a communication channel. For example, the second device 120 may generate the secret key based on at least one of the first public key, a second private key, the identification information of the first device 110, and the identification information of the second device 120.

The second device 120 may encrypt the network key by using the generated secret key. In addition, the second device 120 may transmit the encrypted network key to the first device 110.

The first device 110 according to an embodiment may receive the encrypted network key from the second device 120, thereby securely sharing the network key between the first device 110 and the second device 120.

In operation S560, the first device 110 may decrypt the encrypted network key by using the generated secret key.

The first device 110 according to an embodiment may participate in the network relayed by the second device 120, by using the network key.

Figure 6:
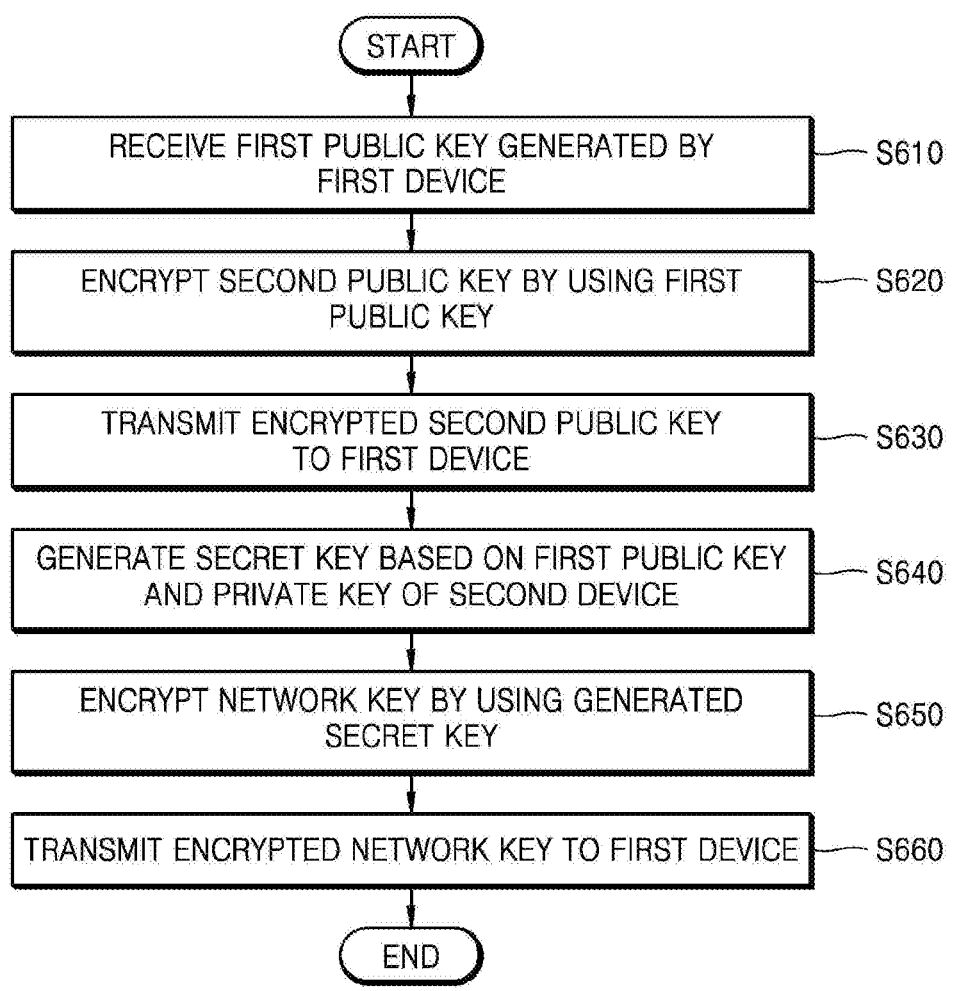
FIG. 6 is a flowchart of a method of communicating with the first device by the second device based on a public key exchange protocol, according to an embodiment.

FIG. 6 is a flowchart of a method of communicating with the first device 110 by the second device 120 based on a public key exchange protocol, according to an embodiment.

In operation S610, the second device 120 may receive a first public key from the first device 110.

The second device 120 according to an embodiment may receive the first public key from the first device 110 together with a network participation request. However, the receiving of the first public key together with the network participation request is merely an example and the network participation request and the first public key may be received from the first device 110 as separate messages.

In operation S620, the second device 120 may encrypt a second public key by using the first public key.

The second device 120 according to an embodiment may encrypt the second public key by using the first public key and a credential pre-shared with the first device 110.

In operation S630, the second device 120 may transmit the encrypted second public key to the first device 110.

In operation S640, the second device 120 may generate a secret key based on the first public key and a second private key of the second device 120.

The second device 120 according to an embodiment may generate the secret key for encrypting a network key required for a communication channel. For example, the second device 120 may generate the secret key based on at least one of the first public key, the second private key, identification information of the first device 110, and identification information of the second device 120.

In operation S650, the second device 120 may encrypt the network key by using the generated secret key. It may be assumed that the first device 110 and the second device 120 according to an embodiment use the same encryption function and the same encryption input parameter.

In operation S660, the second device 120 may transmit the encrypted network key to the first device 110.

The first device 110 according to an embodiment may decrypt the encrypted network key by using a secret key generated by the first device 110. When the first device 110 is a device permitted to participate in a network, the first device 110 may decrypt the network key by using the secret key.

An encrypted communication channel may be established between the second and first devices 120 and 110 as the first device 110 decrypts the network key.

Figure 7:
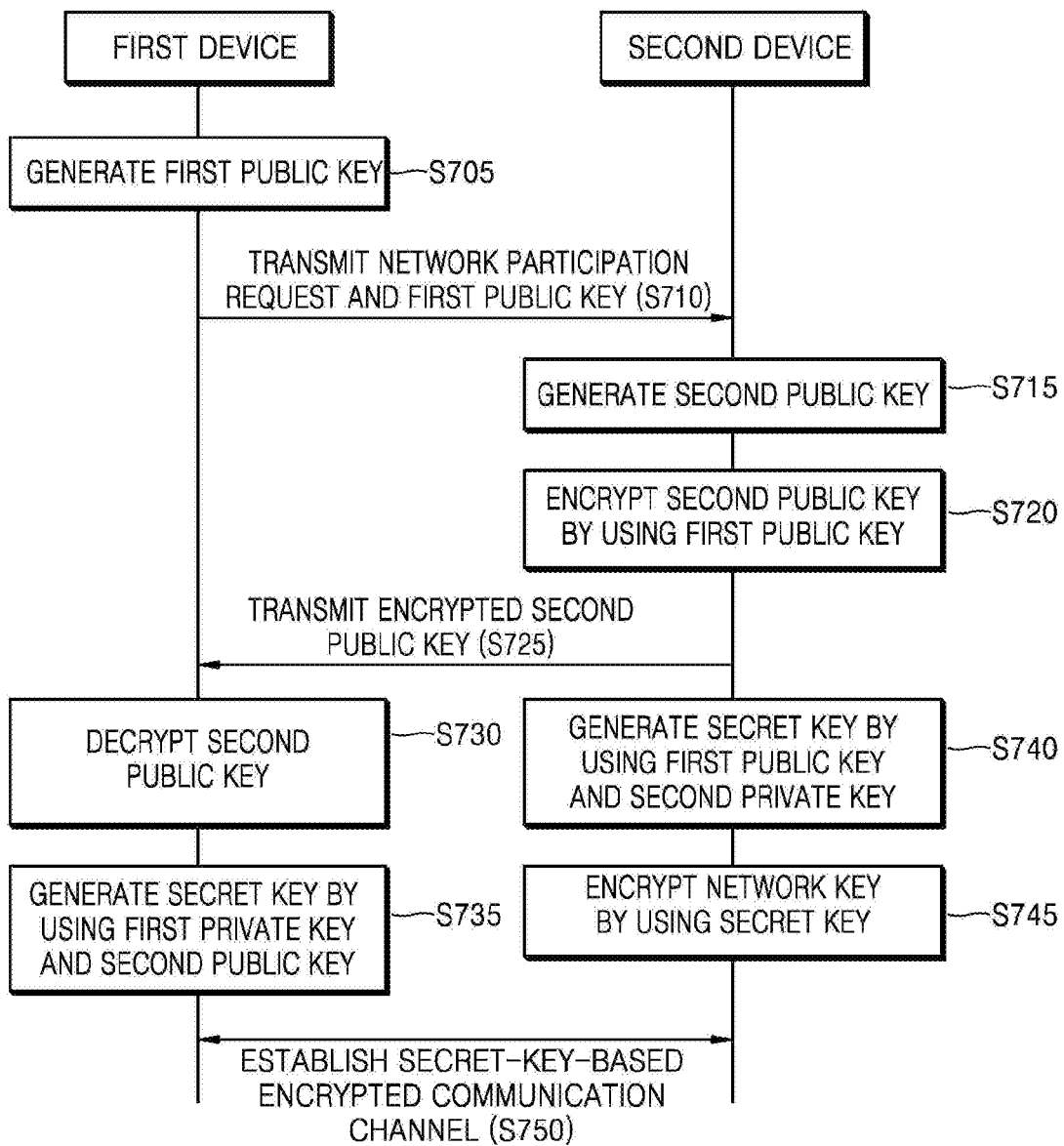
FIG. 7 is a flowchart of a communication method between the first device and the second device based on a public key exchange protocol, according to an embodiment.

FIG. 7 is a flowchart of a communication method between the first device 110 and the second device 120 based on a public key exchange protocol, according to an embodiment.

In operation S705, the first device 110 may generate a first public key.

The first device 110 according to an embodiment may generate a first private key by generating an arbitrary random number. The first device 110 may generate the first public key by applying a preset function shared with the second device 120, to the generated first private key.

In operation S710, the first device 110 may transmit a network participation request and the first public key to the second device 120.

The first device 110 according to an embodiment may transmit the first public key to the second device 120 together with the network participation request. However, the transmitting of the first public key together with the network participation request is merely an example and, alternatively, the first device 110 may transmit the network participation request and the first public key to the second device 120 as separate messages.

In operation S715, the second device 120 may generate a second public key.

The second device 120 according to an embodiment may generate a second private key by generating an arbitrary random number. The second device 120 may generate the second public key by applying a preset function shared with the first device 110, to the generated second private key.

In operation S720, the second device 120 may encrypt the second public key by using the first public key. The second device 120 according to an embodiment may encrypt the second public key by using the first public key received from the first device 110.

In operation S725, the second device 120 may transmit the encrypted second public key to the first device 110.

In operation S730, the first device 110 may decrypt the encrypted second public key.

In operation S735, the first device 110 may generate a secret key by using the first private key and the second public key.

For example, the first device 110 may generate the secret key based on at least one of the first public key, the second private key, identification information of the first device 110, and identification information of the second device 120.

In operation S740, the second device 120 may generate a secret key by using the first public key and the second private key.

For example, the second device 120 may generate the secret key based on at least one of the first public key, the second private key, the identification information of the first device 110, and the identification information of the second device 120.

In operation S745, the second device 120 may encrypt a network key by using the secret key.

In operation S750, the first device 110 and the second device 120 may establish an encrypted communication channel therebetween by transmitting/receiving the encrypted network key.

The first device 110 according to an embodiment may decrypt the encrypted network key received from the second device 120, by using the generated secret key.

Figure 8:
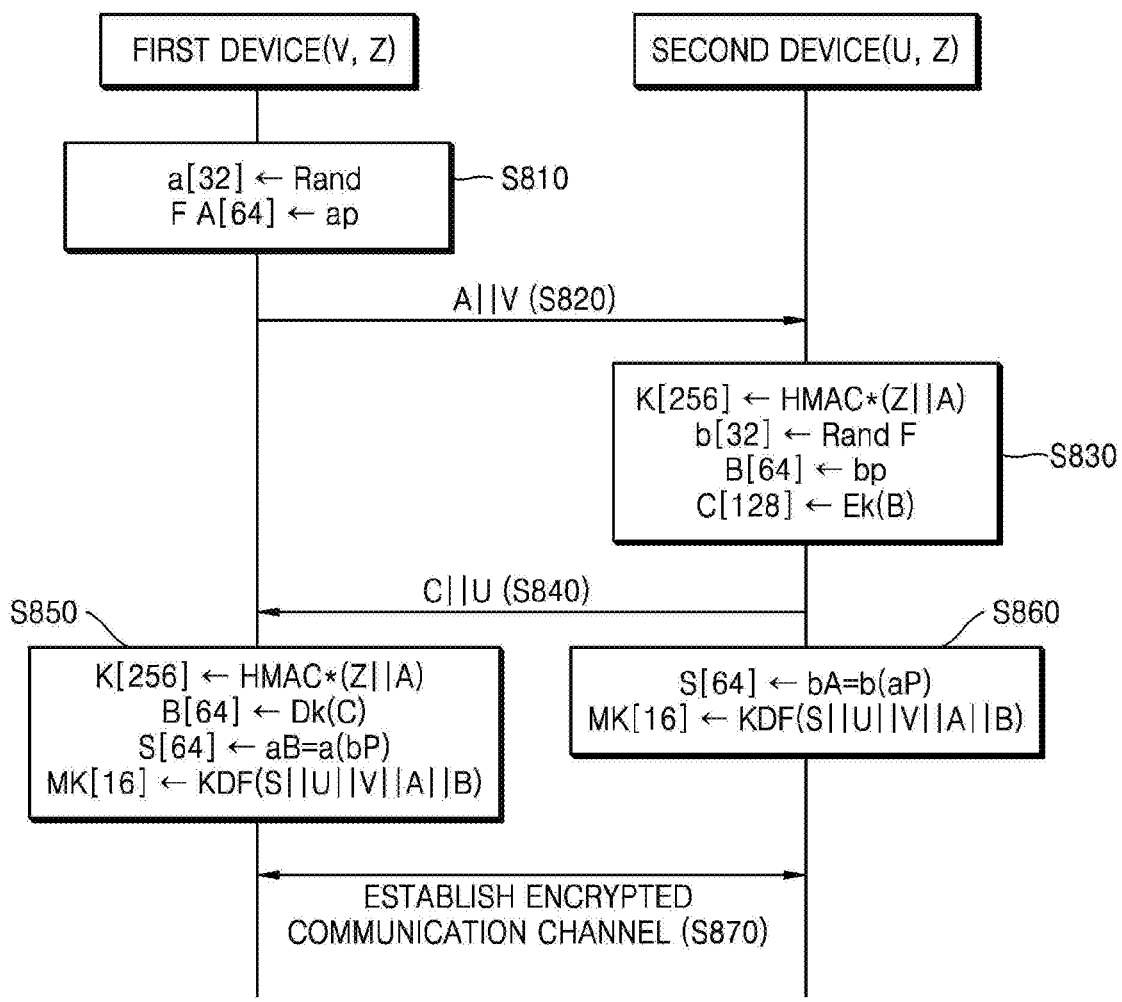
FIG. 8 is a specific flowchart of a communication method between the first device and the second device based on a public key exchange protocol, according to an embodiment.

FIG. 8 is a specific flowchart of a communication method between the first device 110 and the second device 120 based on a public key exchange protocol, according to an embodiment.

In operation S810, the first device 110 may generate a first private key by generating a random number a. In addition, the first device 110 may generate a first public key A by multiplying the first private key a by a preset parameter p. In the current embodiment, the first public key A corresponds to "ap".

In operation S820, the first device 110 may transmit the first public key A to the second device 120 together with identification information z of the first device 110.

In operation S830, the second device 120 may generate a key K by inputting the received first public key A and a credential Z shared with the first device 110, to an encryption function E.

Furthermore, the second device 120 according to an embodiment may generate a second private key by generating a random number b. In addition, the second device 120 may generate a second public key B by multiplying the second private key b by the preset parameter p. In the current embodiment, the second public key B corresponds to "bp".

The second device 120 according to an embodiment may encrypt the second public key by using the generated key K. For example, the second device 120 may set the generated key K as an input parameter, and encrypt the second public key B by using the encryption function E, thereby generating an encrypted second public key C.

In operation S840, the second device 120 may transmit the encrypted second public key C to the first device 110. In addition, the second device 120 may transmit the encrypted second public key C to the first device 110 together with identification information U of the second device 120.

In operation S850, the first device 110 may generate a key K by using a credential A and the first public key A. The first device 110 may decrypt the encrypted second public key C received from the second device 120, by using the generated key K.

The first device 110 according to an embodiment may generate a session key S by using the first private key a and the second public key B. In addition, the first device 110 according to an embodiment may generate a secret key by using the session key S, the identification information V of the first device 110, the identification information U of the second device 120, the first public key A, and the second public key B.

In operation S860, the second device 120 may generate a session key S by using the second private key b and the first public key A. In addition, the second device 120 according to an embodiment may generate a secret key by using the session key S, the identification information V of the first device 110, the identification information U of the second device 120, the first public key A, and the second public key B.

In operation S870, the first device 110 and the second device 120 may establish an encrypted communication channel therebetween by transmitting/receiving a network key encrypted using the secret key.

Figure 9:
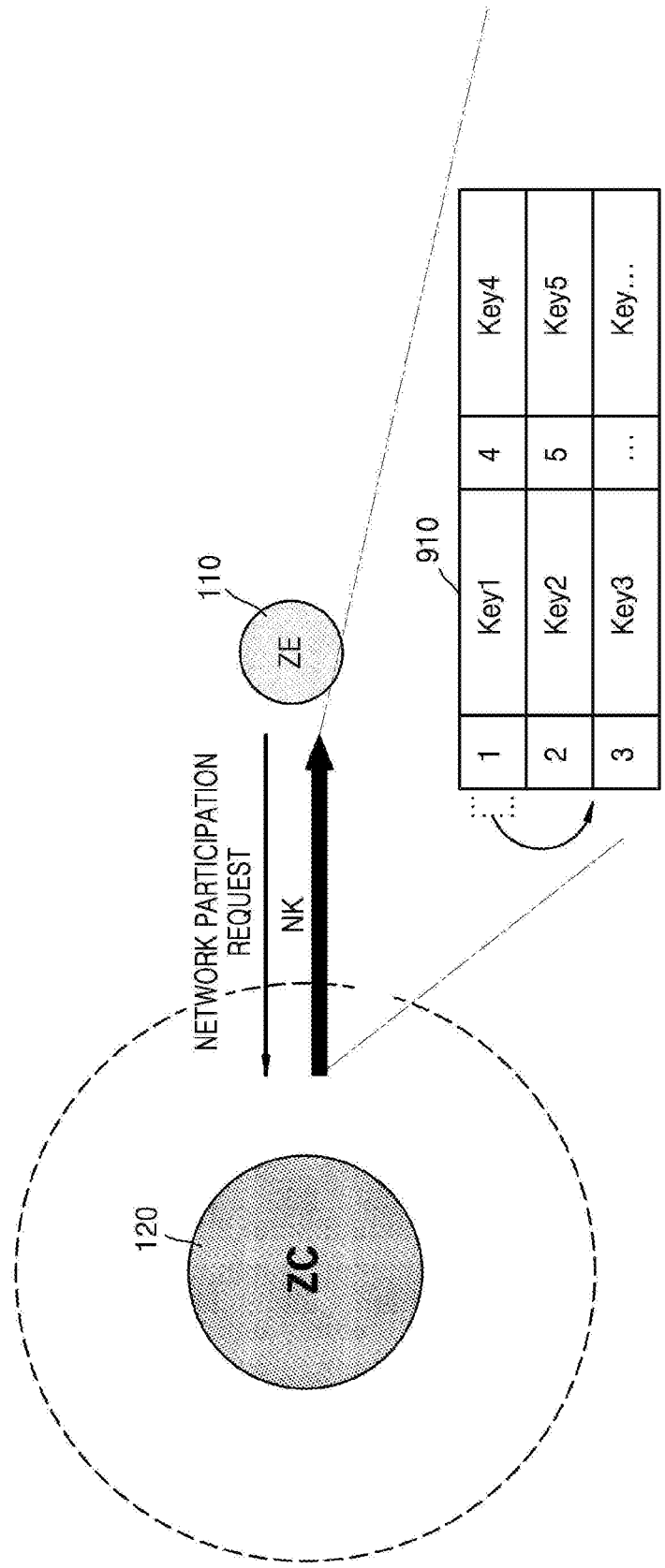
FIG. 9 is a conceptual diagram for describing a communication method between the first device and the second device based on a security card exchange protocol, according to an embodiment.

FIG. 9 is a conceptual diagram for describing a communication method between the first device 110 and the second device 120 based on a security card exchange protocol, according to an embodiment.

The first device 110 according to an embodiment may transmit, to the second device 120, a network participation request for requesting to participate in a network of the second device 120. In addition, the first device 110 may transmit a random number value generated by the first device 110, to the second device 120 together with the network participation request.

The second device 120 according to an embodiment may generate a security card 910 including one or more secret keys, by generating random number values. Referring to FIG. 9, the second device 120 may generate the security card 910 including six secret keys.

In addition, the second device 120 according to an embodiment may encrypt the security card 910 by using the random number value received from the first device 110. For example, the second device 120 may encrypt the security card 910 by using the random number value received from the first device 110 based on an encryption function such as a hash function, message authentication code (MAC), or block cipher.

The second device 120 may transmit the encrypted security card 910 to the first device 110. The first device 110 may decrypt the encrypted security card 910 by using the generated random number value.

The first device 110 according to an embodiment may select at least one of the six secret keys included in the security card 910 and transmit the same to the second device 120. The second device 120 may determine whether to permit the first device 110 to participate in the network, by determining whether the at least one secret key received from the first device 110 matches that included in the security card 910.

The communication method based on the security card exchange protocol, according to an embodiment, since a function for generating a key does not need to be pre-shared between the first device 110 and the second device 120, an encrypted communication channel may be more easily established between the first device 110 and the second device 120.

Figure 10:
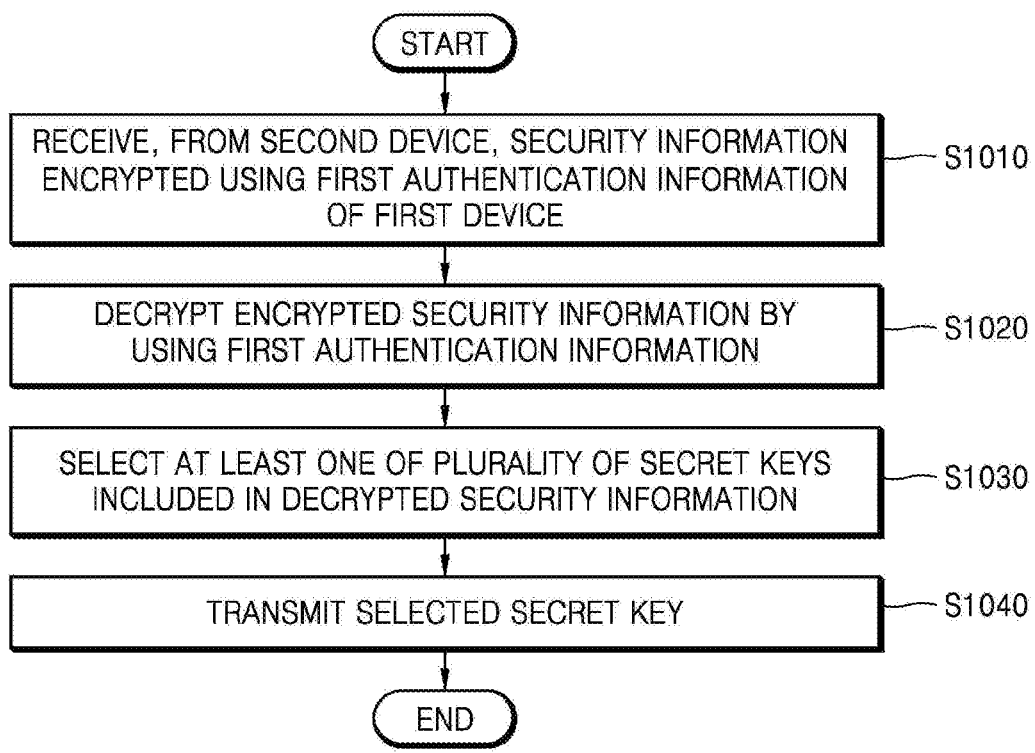
FIG. 10 is a flowchart of a method of communicating with the second device by the first device based on a security card exchange protocol, according to an embodiment.

FIG. 10 is a flowchart of a method of communicating with the second device 120 by the first device 110 based on a security card exchange protocol, according to an embodiment.

In operation S1010, the first device 110 may receive, from the second device 120, security information encrypted using first authentication information of the first device 110. Herein, the security information may be a security card including a plurality of secret keys. The security card is merely an example and the security information is not limited thereto.

The first authentication information according to an embodiment may include a random number value arbitrarily generated by the first device 110. For example, when the random number value arbitrarily generated by the first device 110 is denoted by a, the first authentication information may be a. However, the random number value a is merely an example and the first device 110 may select one of pre-stored values and use the same as the first authentication information.

The first device 110 according to an embodiment may transmit the first authentication information to the second device 120. Herein, the first device 110 may transmit a network participation request for requesting to participate in a network of the second device 120, together with the first authentication information. However, the transmitting of the network participation request together with the first authentication information is merely an example and the first device 110 may transmit the first authentication information and the network participation request as separate messages.

The second device 120 may encrypt the security card by using the first authentication information received from the first device 110. Herein, the security card may include one or more secret keys determined based on random number values arbitrarily generated by the second device 120. The first device 110 may receive, from the second device 120, the security card encrypted using the first authentication information.

In operation S1020, the first device 110 may decrypt the encrypted security information by using the first authentication information.

The first device 110 according to an embodiment may decrypt the encrypted security information by using the first authentication information. Herein, the first device 110 may have pre-stored therein an encryption function used to encrypt the security information of the second device 120. However, the pre-stored encryption function is merely an example and information about the encryption function used to encrypt the security information may not be pre-shared between the first device 110 and the second device 120.

In operation S1030, the first device 110 may select at least one of the plurality of secret keys included in the decrypted security information.

When the security information is a security card according to an embodiment, the security card may include one or more secret keys. For example the security card may include six secret keys.

The first device 110 according to an embodiment may select at least one of the one or more secret keys included in the security card. For example, the first device 110 may select a first key and a third key among the six secret keys.

In operation S1040, the first device 110 may transmit the selected secret key to the second device 120. For example, the first device 110 may transmit the selected first and third keys to the second device 120.

The first device 110 according to an embodiment may express that the first device 110 is an authorized device, by transmitting the selected secret key to the second device 120.

The second device 120 according to an embodiment may compare the secret key received from the first device 110, to the secret keys included in the security card. For example, the second device 120 may determine whether each of the first and third keys received from the first device 110 matches one of the secret keys included in the security card.

When the secret key received from the first device 110 matches one of the secret keys included in the security card, the second device 120 may establish an encrypted communication channel for the first device 110. Alternatively, when the secret key received from the first device 110 does not match any of the secret keys included in the security card, the second device 120 may not establish an encrypted communication channel for the first device 110.

Figure 11:
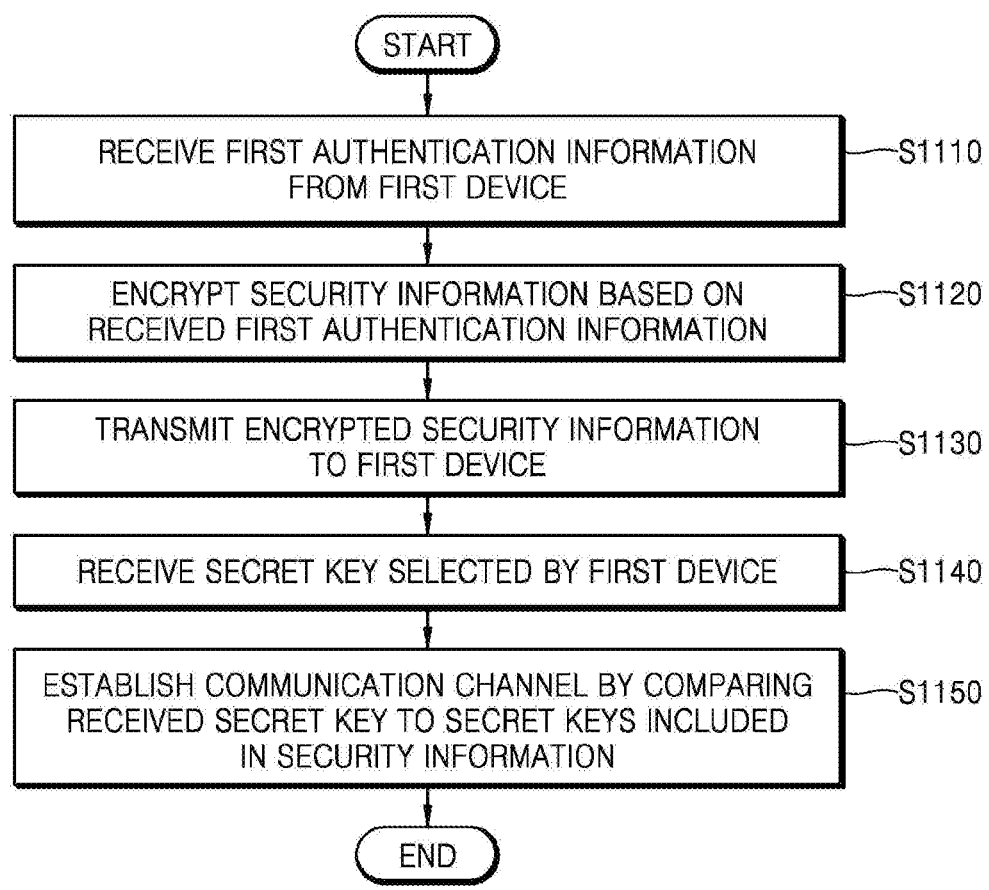
FIG. 11 is a flowchart of a method of communicating with the first device by the second device based on a security card exchange protocol, according to an embodiment.

FIG. 11 is a flowchart of a method of communicating with the first device 110 by the second device 120 based on a security card exchange protocol, according to an embodiment.

In operation S1110, the second device 120 may receive first authentication information from the first device 110. Herein, the first authentication information may be, for example, a random number value generated by the first device 110. However, the random number value is merely an example and the authentication information is not limited thereto.

In operation S1120, the second device 120 may encrypt security information generated by the second device 120, based on the first authentication information received from the first device 110.

The second device 120 according to an embodiment may generate the security information. For example, the second device 120 may generate a security card including one or more secret keys. Herein, the one or more secret keys may be generated based on one or more random number values generated by the second device 120.

The second device 120 according to an embodiment may encrypt the security card by using the random number value received from the first device 110. For example, the second device 120 may encrypt the security card by using an encryption function and the random number value (e.g., a) received from the first device 110. Herein, a hash function, message authentication code (MAC), or block cipher may be used as the encryption function. However, the above-mentioned functions are merely examples and the encryption function is not limited thereto.

In operation S1130, the second device 120 may transmit the encrypted security information to the first device 110.

The second device 120 according to an embodiment may transmit the encrypted security information to the first device 110 in order to prevent unauthorized external devices from obtaining the security information of the second device 120.

In operation S1140, the second device 120 may receive a secret key selected by the first device 110.

According to an embodiment, the first device 110 may decrypt the encrypted security information received from the second device 120, by using the first authentication information. For example, the first device 110 may decrypt the encrypted security card by using the random number value a.

The first device 110 may select at least one of the secret keys included in the encrypted security card. The first device 110 may transmit the selected secret key to the second device 120.

In operation S1150, the second device 120 may determine whether to establish an encrypted communication channel for the first device 110, by comparing the received secret key to the secret keys included in the security information.

The second device 120 according to an embodiment may compare the secret keys included in the security card, to the secret key received from the first device 110. For example, when a first key and a third key received from the first device 110 by the second device 120 are included in the security card, the second device 120 may establish an encrypted communication channel for the first device 110. Alternatively, when the first and third keys received from the first device 110 are not included in the security card, the second device 120 may not establish an encrypted communication channel for the first device 110.

Figure 12:
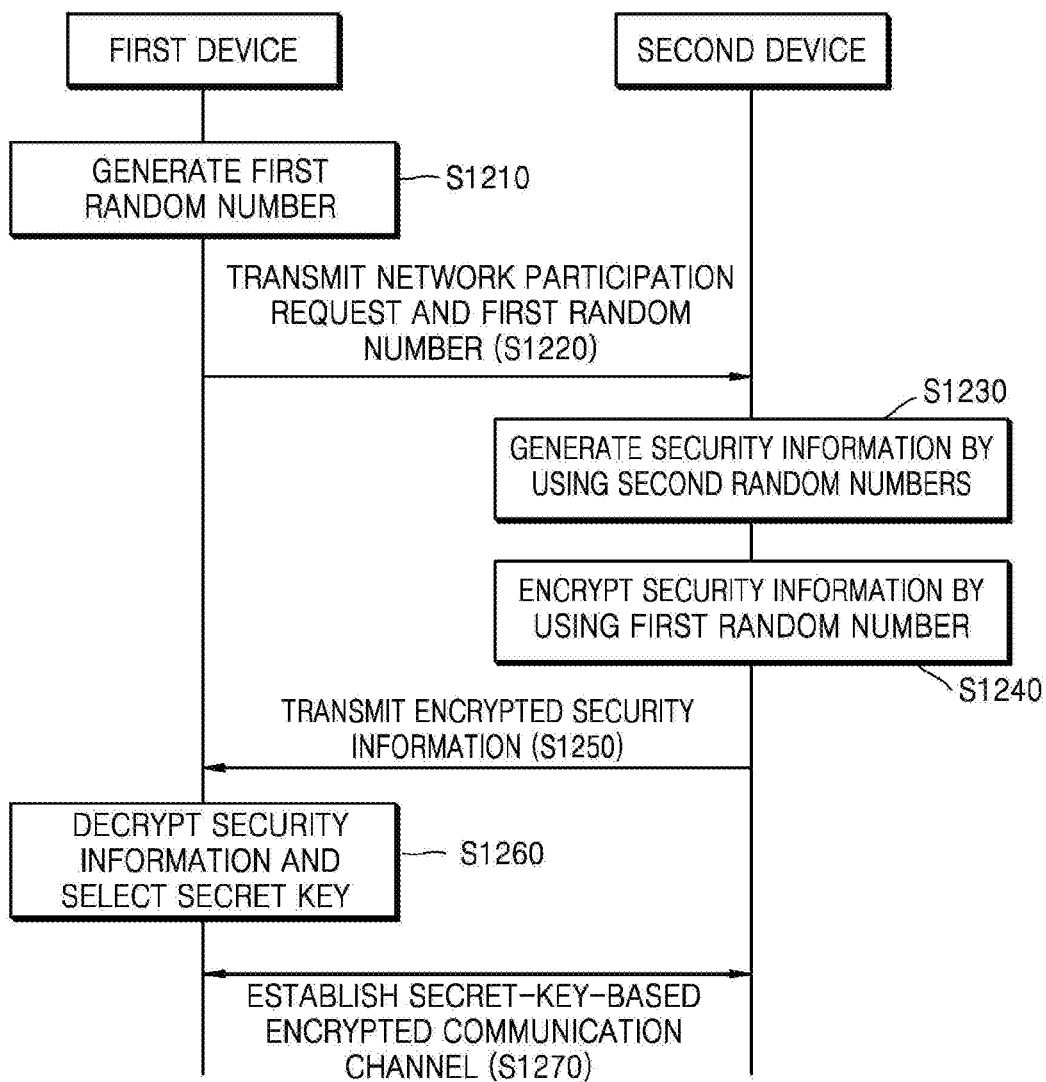
FIG. 12 is a flowchart of a communication method between the first device and the second device based on a security card exchange protocol, according to an embodiment.

FIG. 12 is a flowchart of a communication method between the first device 110 and the second device 120 based on a security card exchange protocol, according to an embodiment.

In operation S1210, the first device 110 may generate a first random number. However, the first random number is merely an example of first authentication information and the first device 110 may have pre-stored therein values usable for the first authentication information.

In operation S1220, the first device 110 may transmit a network participation request and the first random number to the second device 120.

In operation S1230, the second device 120 may generate security information by using one or more second random numbers. For example, the second device 120 may generate a security card by using the second random numbers. Herein, the security card may include one or more secret keys. The second device 120 may use the second random numbers as the secret keys. Alternatively, the second device 120 may generate may generate the secret keys by substituting the second random numbers in a function.

In operation S1240, the second device 120 may encrypt the security information by using the first random number. The second device 120 according to an embodiment may encrypt the security information by using the first random number received from the first device 110, in order to prevent unauthorized external devices from obtaining the security information.

In operation S1250, the second device 120 may transmit the encrypted security information.

In operation S1260, the first device 110 may decrypt the security information and select a secret key therefrom. The first device 110 according to an embodiment may decrypt the security card received from the second device 120, by using the first random number transmitted to the second device 120. In addition, the first device 110 may select at least one of the one or more secret keys included in the security card.

In operation S1270, the first device 110 and the second device 120 may establish a secret-key-based encrypted communication channel therebetween.

The first device 110 according to an embodiment may transmit the selected secret key to the second device 120. When the secret key received from the first device 110 matches one of the secret keys included in the security card, the second device 120 may establish an encrypted communication channel for the first device 110.

Figure 13:
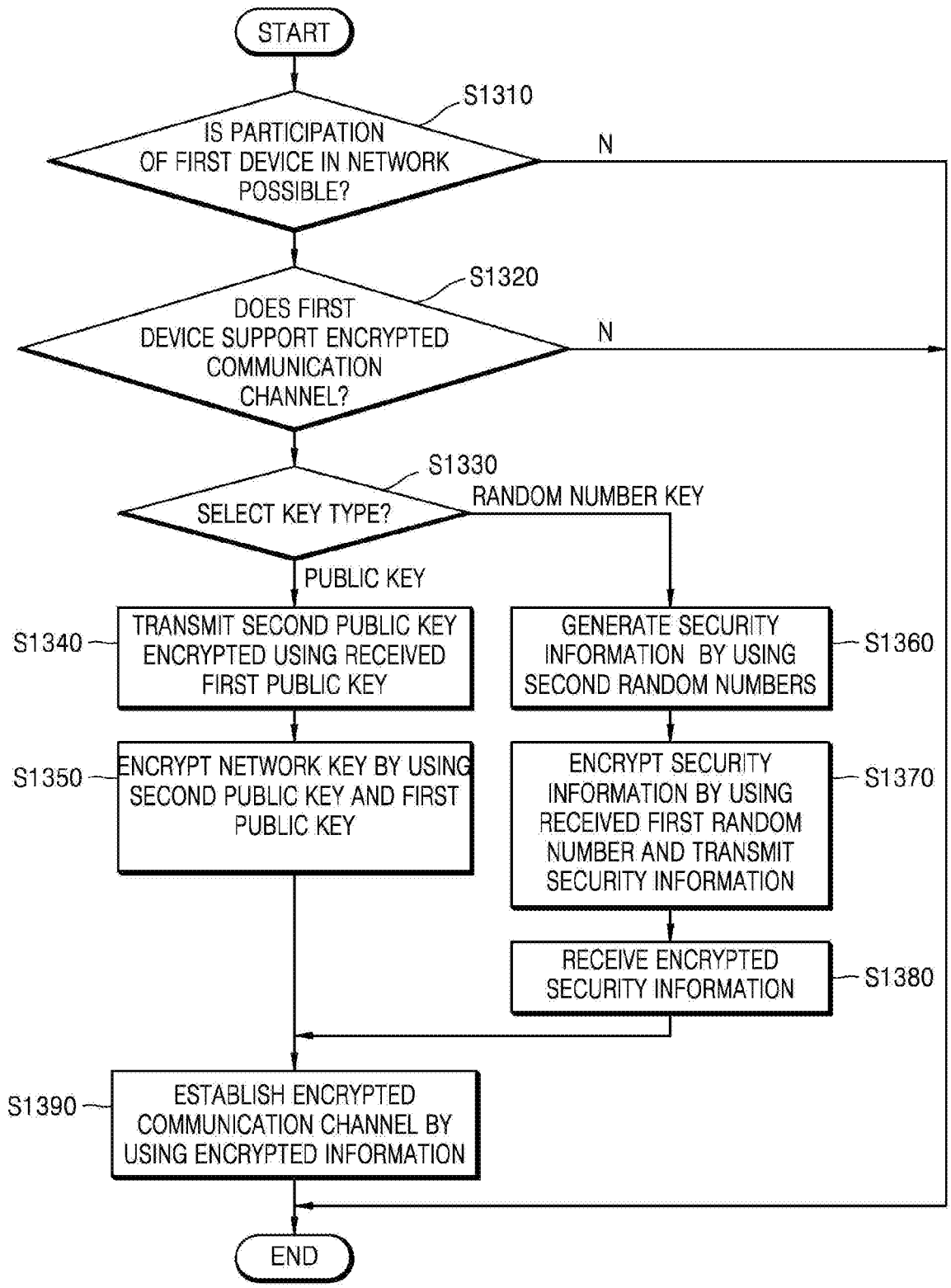
FIG. 13 is a flowchart of a method of determining a protocol used to determine whether to permit the first device to participate in a network, by the second device, according to an embodiment.

FIG. 13 is a flowchart of a method of determining a protocol used to determine whether to permit the first device 110 to participate in a network, by the second device 120, according to an embodiment.

In operation S1310, as a network participation request is received from the first device 110, the second device 120 may determine whether participation of the first device 110 in a network is possible. For example, when the network of the second device 120 currently lacks network resources allocable to the first device 110, the second device 120 may determine that participation of the first device 110 in the network is not possible.

In operation S1320, the second device 120 may determine whether the first device 110 supports an encrypted communication channel.

According to an embodiment, the second device 120 may determine whether the first device 110 supports a public-key-based protocol or security-card-based protocol for establishing an encrypted communication channel.

In operation S1330, the second device 120 may select an encrypt key type used to establish an encrypted communication channel for the first device 110.

For example, the second device 120 may select one of the public-key-based protocol and the security-card-based protocol based on a protocol supported by the first device 110. When the first device 110 supports both of the public-key-based protocol and the security-card-based protocol, the second device 120 may select a protocol based on communication states of the first device 110 and the second device 120. For example, the second device 120 may select the security-card-based protocol having low complexity.

In operation S1340, the second device 120 may transmit a second public key encrypted using a first public key received from the first device 110, to the first device 110.

In operation S1350, the second device 120 may encrypt a network key by using the second public key and the first public key.

In operation S1360, the second device 120 may generate security information by using second random numbers.

In operation S1370, the second device 120 may transmit the security information encrypted using a first random number received from the first device 110, to the first device 110.

In operation S1380, the second device 120 may receive encrypted security information from the first device 110. For example, the second device 120 may obtain a security key selected by the first device 110, by decrypting the encrypted security information.

In operation S1390, the second device 120 may establish an encrypted communication channel for the first device 110 by receiving encrypted information. The second device 120 according to an embodiment may establish an encrypted communication channel by using an encrypted network key received from the first device 110. Alternatively, the second device 120 may establish an encrypted communication channel by using an encrypted security key received from the first device 110.

Figure 14:
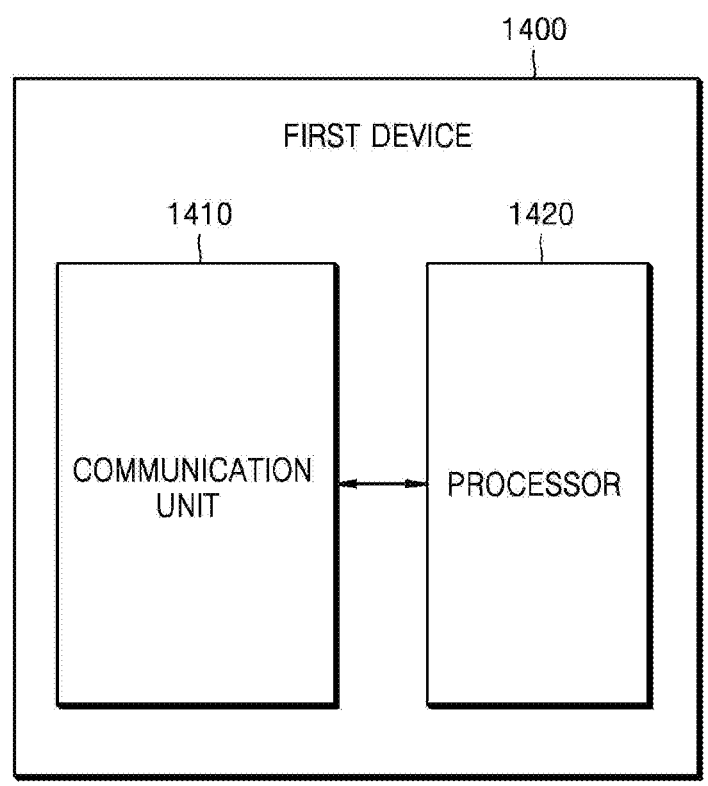
FIGS. 14 and 15 are block diagrams of a first device according to an embodiment.
Figure 15:
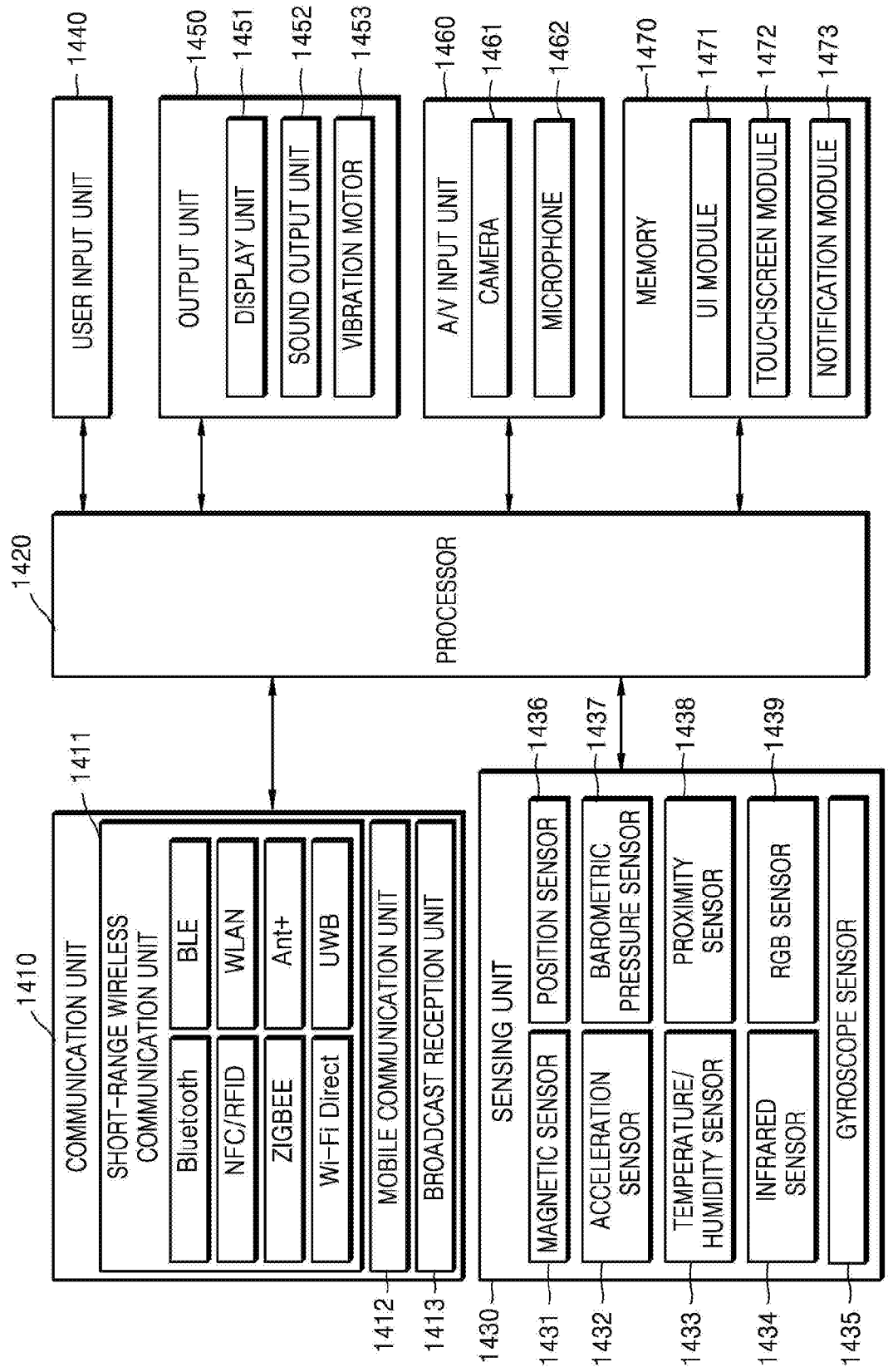

FIGS. 14 and 15 are block diagrams of a first device 1400 according to an embodiment.

As illustrated in FIG. 14, the first device 1400 according to an embodiment may include a communication unit 1410 and a processor 1420. However, not all illustrated elements are essential. The first device 1400 may include a smaller or larger number of elements.

For example, as illustrated in FIG. 15, the first device 1400 according to an embodiment of the present disclosure may further include a sensing unit 1430, a user input unit 1440, an output unit 1450, an audio/video (A/V) input unit 1460, and a memory 1470 in addition to the communication unit 1410 and the processor 1420.

The first device 1400 of FIGS. 14 and 15 may correspond to the first device 110 described above in relation to FIGS. 1 to 13.

The above-mentioned elements will now be described one by one.

The communication unit 1410 receives, from the second device 120, second authentication information encrypted using first authentication information.

The communication unit 1410 according to an embodiment may perform communication between the first device 1400 and the second device 120 by using a determined secret key. In addition, the communication unit 1410 may transmit a first public key to the second device 120. The communication unit 1410 may receive identification information of the second device 120 together with the encrypted second authentication information.

The communication unit 1410 may include one or more elements for enabling the first device 1400 to communicate with the second device 120. For example, the communication unit 1410 may include a short-range wireless communication unit 1411, a mobile communication unit 1412, and a broadcast reception unit 1413.

The short-range wireless communication unit 1411 may include a Bluetooth communication unit, a Bluetooth low energy (BLE) communication unit, a near field communication unit, a wireless local area network (WLAN) (e.g., Wi-Fi) communication unit, a ZigBee communication unit, an infrared data association (IrDA) communication unit, a Wi-Fi direct (WFD) communication unit, an ultra wideband (UWB) communication unit, an Ant+ communication unit, etc., but is not limited thereto.

The mobile communication unit 1412 transmits/receives radio signals to/from at least one of a base station, an external device, and a server in a mobile communication network. Herein, the radio signals may include various types of data based on transmission/reception of voice call signals, video call signals, and text/multimedia messages.

The broadcast reception unit 1413 receives broadcast signals and/or broadcast-related information through broadcast channels from an external device. The broadcast channels may include satellite channels and terrestrial channels. According to another embodiment, the first device 1400 may not include the broadcast reception unit 1413.

The processor 1420 controls overall operations of the first device 1400. For example, the processor 1420 may control all of the communication unit 1410, the sensing unit 1430, the user input unit 1440, the output unit 1450, the A/V input unit 1460, and the memory 1470 by executing programs stored in the memory 1470.

The processor 1420 according to an embodiment decrypts the second authentication information encrypted using the first authentication information. In addition, the processor 1420 may determine the secret key based on the decrypted second authentication information.

Furthermore, the processor 1420 may generate a random number. The processor 1420 according to an embodiment may generate the first public key by using the generated random number.

The processor 1420 according to an embodiment may generate the secret key based on at least one of the first authentication information, the second authentication information, identification information of the first device 1400, and the identification information of the second device 120. In addition, the processor 1420 may decrypt an encrypted network key received from the second device 120, by using the generated secret key.

The processor 1420 according to an embodiment may select at least one of a plurality of secret keys included in decrypted security information. In addition, the processor 1420 may establish an encrypted communication channel between the first device 1400 and the second device 120 by using the determined secret key.

The sensing unit 1430 may include at least one of a magnetic sensor 1431, an acceleration sensor 1432, a temperature/humidity sensor 1433, an infrared sensor 1434, a gyroscope sensor 1435, a position sensor (e.g., global positioning system (GPS)) 1436, a barometric pressure sensor 1437, a proximity sensor 1438, and an RGB sensor (or illuminance sensor) 1439, but is not limited thereto. Functions of the sensors may be intuitively inferred from their names by one of ordinary skill in the art, and thus detailed descriptions thereof are not provided herein.

The user input unit 1440 refers to a means used when a user inputs data to control the first device 1400. For example, the user input unit 1440 may include a keypad, dome switch, touchpad (e.g., capacitive overlay type, resistive overlay type, infrared beam type, surface acoustic wave type, integral strain gauge type, or piezoelectric type), jog wheel, jog switch, etc., but is not limited thereto.

The user input unit 1440 according to an embodiment may receive user inputs required to perform operations of the first device 1400, which are described above in relation to FIGS. 1 to 13.

The output unit 1450 is used to perform an operation determined by the processor 1420, and may include a display unit 1451, a sound output unit 1452, and a vibration motor 1453.

When the display unit 1451 and a touchpad are layered to configure a touchscreen, the display unit 1451 may be used as an input device as well as an output device. The display unit 1451 may include at least one of a liquid crystal display (LCD), thin film transistor-liquid crystal display (TFT- LCD), organic light-emitting diode (OLED), flexible display, a three-dimensional (3D) display, and electrophoretic display. The first device 1400 may further include one or more display units in addition to the display unit 1451 based on the configuration of the first device 1400.

The sound output unit 1452 outputs audio data received from the communication unit 1410 or stored in the memory 1470. In addition, the sound output unit 1452 outputs sound signals related to functions performed by the first device 1400 (e.g., call signal reception sound, message reception sound, and notification sound). The sound output unit 1452 may include a speaker, a buzzer, etc.

The vibration motor 1453 may output vibration signals. For example, the vibration motor 1453 may output vibration signals corresponding to output of audio data or video data (e.g., call signal reception sound and message reception sound). In addition, the vibration motor 1453 may output vibration signals when touches are input to the touchscreen.

The A/V input unit 1460 is used to input audio signals or video signals, and may include a camera 1461 and a microphone 1462. The camera 1461 may obtain still or moving image frames by using an image sensor in a video call mode or a camera mode. The images captured by the image sensor may be processed by the processor 1420 or an image processor (not shown).

The image frames processed by the camera 261 may be stored in the memory 1470 or may be transmitted through the communication unit 1410 to an external device. The camera 1461 may include two or more cameras based on the configuration of the first device 1400.

The microphone 1462 receives an external audio signal and processes the same into electrical voice data. For example, the microphone 1462 may receive the audio signal from an external first device or a person. The microphone 1462 may use various noise cancellation algorithms to remove noise generated while the external audio signal is being received.

The memory 1470 may store programs for processing and control operations of the processor 1420, and store input/output data. The memory 1470 according to an embodiment may store at least one encryption function and at least one input parameter used for encryption. In addition, the memory 1470 may store credential information shared between the first device 1400 and the second device 120.

The memory 1470 may include at least one type of storage medium among a flash memory, hard disk, multimedia card micro, card type memory (e.g., secure digital (SD) or extreme digital (XD) memory), random access memory (RAM), static random access memory (SRAM), read-only memory (ROM), electrically erasable programmable ROM (EEPROM), programmable ROM (PROM), magnetic memory, magnetic disc, and optical disc. Alternatively or additionally, the first device 1400 may use a web storage or cloud server serving as the memory 1470 on the Internet.

The programs stored in the memory 1470 may be divided into a plurality of modules, e.g., a user interface (UI) module 1471, a touchscreen module 1472, and a notification module 1473, based on functions thereof.

The UI module 1471 may provide user interfaces (UIs) or graphic user interfaces (GUIs) specialized for each application and operable in the first device 1400. The touchscreen module 1472 may detect a touch gesture of the user on the touchscreen, and transmit information about the touch gesture to the processor 1420. The touchscreen module 1472 according to an embodiment of the present disclosure may recognize and analyze touch code. The touchscreen module 1472 may be configured as independent hardware including a controller.

Various sensors may be provided in or near the touchscreen to detect touches or proximity touches on the touchscreen. An example of the sensors for detecting touches on the touchscreen is a tactile sensor. The tactile sensor refers to a sensor capable of detecting human-sensible or greater strengths of touches of a certain object. The tactile sensor may detect various types of information, e.g., roughness of a contact surface, hardness of a contact object, and temperature of a contact point.

Another example of the sensors for detecting touches on the touchscreen is a proximity sensor.

The proximity sensor refers to a sensor capable of detecting the presence of an object approaching or in proximity of a certain detection surface by using force of an electromagnetic field or infrared light without a mechanical contact. Examples of the proximity sensor include a transmissive photoelectric sensor, direct-reflective photoelectric sensor, mirror-reflective photoelectric sensor, high-frequency oscillation-type proximity sensor, capacitive proximity sensor, magnetic proximity sensor, and infrared proximity sensor. The touch gesture of the user may include tap, touch and hold, double tap, drag, pan, flick, drag and drop, swipe, etc.

The notification module 1473 may generate a signal for notifying that an event of the first device 1400 has occurred. The notification module 1473 may output the notification signal in the form of a video signal via the display unit 1451, in the form of an audio signal via the sound output unit 1452, or in the form of a vibration signal via the vibration motor 1453.

Figure 16:
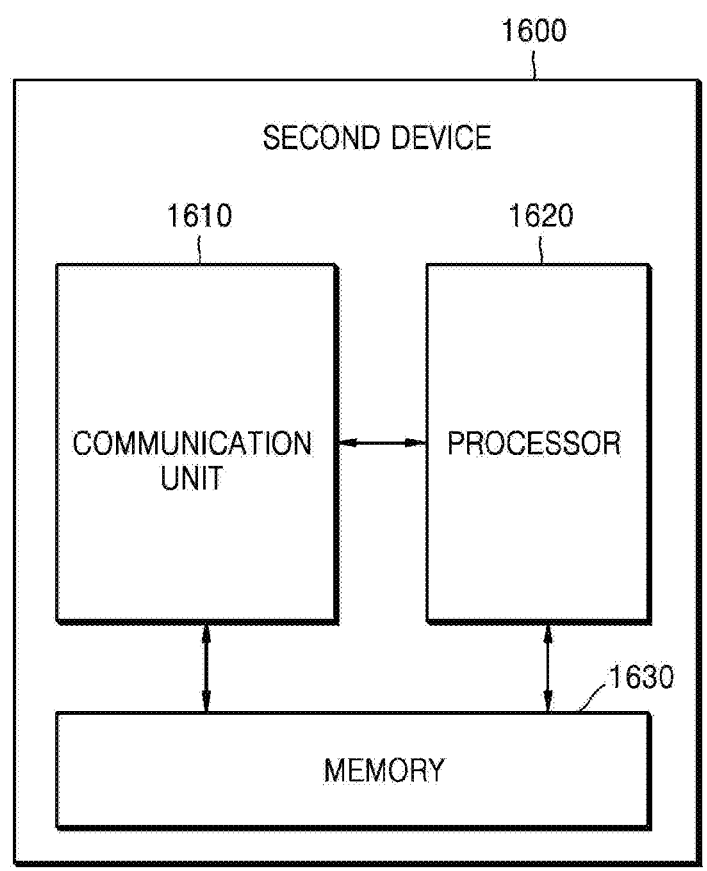
FIG. 16 is a block diagram of a second device according to an embodiment.

FIG. 16 is a block diagram of a second device 1600 according to an embodiment.

As illustrated in FIG. 16, the second device 1600 according to an embodiment may include a communication unit 1610, a processor 1620, and a memory 1630. However, not all illustrated elements are essential. The second device 1600 may include a smaller or larger number of elements.

The communication unit 1610 according to an embodiment receives first authentication information from the first device 1400. In addition, the communication unit 1610 may transmit encrypted second authentication information to the first device 1400.

The communication unit 1610 may perform communication between the first device 1400 and the second device 1600 as the encrypted second authentication information is decrypted by the first device 1400.

In addition, the communication unit 1610 according to an embodiment may receive a first public key generated by the first device 1400. Alternatively, the communication unit 1610 may receive identification information of the first device 1400 together with the first authentication information.

The communication unit 1610 according to an embodiment may transmit an encrypted network key to the first device 1400. In addition, the communication unit 1610 may receive at least one secret key selected by the first device 1400.

The processor 1620 encrypts the second authentication information based on the received first authentication information. In addition, the processor 1620 according to an embodiment may encrypt a second public key by using the received first public key.

The processor 1620 according to an embodiment may generate a secret key based on at least one of the first authentication information, the second authentication information, the identification information of the first device 1400, and identification information of the second device 1600. In addition, the processor 1620 may encrypt the network key by using the generated secret key.

The processor 1620 according to an embodiment may determine whether the received at least one secret key is included in a plurality of secret keys. The processor 1620 may establish an encrypted communication channel between the first device 1400 and the second device 1600 by using the determined secret key.

The memory 1630 may store programs for processing and control operations of the processor 1620, and store input/output data. The memory 1630 according to an embodiment may store at least one encryption function and at least one input parameter used for encryption. In addition, the memory 1630 may store credential information shared between the first device 1400 and the second device 1600.

The device according to the afore-described embodiments may comprise a processor, a memory for storing program data and executing it, a permanent storage such as a disk drive, a communications port for handling communications with external devices, and user interface devices, including a touch panel, keys, buttons, etc. When software modules or algorithms are involved, these software modules may be stored as program instructions or computer-readable codes executable on the processor on a computer-readable medium. Examples of the computer-readable recording medium include magnetic storage media (e.g., ROM, floppy disks, hard disks, etc.), and optical recording media (e.g., CD-ROMs, or DVDs). The computer-readable recording medium can also be distributed over network coupled computer systems so that the computer-readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the embodiments, reference has been made to the embodiments illustrated in the drawings, and specific terminology has been used to describe these embodiments. However, no limitation of the scope of the embodiments is intended by this specific terminology, and the embodiments should be construed to encompass all elements that would normally occur to one of ordinary skill in the art.

The embodiments may be described in terms of functional blocks and various routines. Such functional blocks may be realized by any number of hardware and/or software elements configured to perform the specified functions. For example, the embodiments may employ various integrated circuit elements, e.g., memory elements, processing elements, logic elements, look-up tables, and the like, which may carry out a variety of functions under the control of one or more microprocessors or other control devices. Similarly, where the elements of the embodiments are implemented using software programming or software elements, the embodiments may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments could employ any number of conventional techniques for electronics configuration, signal processing and/or control, data processing and the like. The words "mechanism", "element", "means", and "configuration" are used broadly and are not limited to mechanical or physical elements, but can include software routines in conjunction with processors, etc.

The particular implementations shown and described herein are illustrative examples of the embodiments and are not intended to otherwise limit the scope of the embodiments in any way. For the sake of brevity, conventional electronics, control systems, software development and other functional aspects of the systems may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device. Moreover, no element is essential for implementation of the embodiments unless the element is specifically described as "essential" or "critical".

The invention claimed is:

1. A method comprising:
transmitting, by a first electronic device to a second electronic device, a first public key;
encrypting, by the second electronic device, a second public key based on the first public key;
obtaining, by the first electronic device from the second electronic device, the encrypted second public key that was encrypted using the transmitted first public key;
decrypting, by the first electronic device, the encrypted second public key by using the first public key;
generating, by the first electronic device, a secret key based on a first private key and the second public key;
obtaining, by the first electronic device from the second electronic device, an encrypted network key, wherein a network key is encrypted based on a secret key generated, at the second electronic device based on the first public key and a second private key;
decrypting, by the first electronic device, the encrypted network key by using the secret key;
establishing an encrypted communication channel between the first electronic device and the second electronic device by using the network key; and
performing communication, by the first electronic device, with the second electronic device by using the encrypted communication channel.

2. A first electronic device comprising:
a communication interface configured to perform short-range wireless communication with a second electronic device; and
a hardware processor configured to:
control the communication interface to transmit a first public key to the second electronic device;
obtain, from the second electronic device, a second public key encrypted using the transmitted first public key;
decrypt the encrypted second public key by using the first public key;
generate a secret key based on a first private key and the second public key;
obtain, from the second electronic device, an encrypted network key, wherein a network key is encrypted based on a secret key generated, at the second electronic device based on the first public key and a second private key;
decrypt the encrypted network key by using the secret key;

establish an encrypted communication channel between the first electronic device and the second electronic device by using the network key; and control the communication interface to perform communication with the second electronic device by using the encrypted communication channel.

3. The first electronic device of claim 2, wherein the first public key is generated at the first electronic device and the second public key is generated at the second electronic device.

4. The first electronic device of claim 3, wherein the hardware processor is further configured to generate the first public key by using a random number.

5. The first electronic device of claim 2, wherein the communication interface is further configured to obtain identification information of the second electronic device together with the encrypted second public key.

6. The first electronic device of claim 2, wherein
the second public key comprises a plurality of secret keys, and
the hardware processor is further configured to select at least one of the plurality of secret keys.

7. A second electronic device comprising:
a communication interface configured to perform short-range wireless communication with a first electronic device; and
a hardware processor configured to:
control the communication interface to obtain a first public key from the first electronic device;
encrypt a second public key based on the obtained first public key;
control the communication interface to transmit, to the first electronic device, the encrypted second public key;
generate a secret key based on the first public key and a second private key;
encrypt a network key based on the secret key;
control the communication interface to transmit the encrypted network key to the first electronic device;
establish an encrypted communication channel between the first electronic device and the second electronic device by using the network key; and
perform communication with the second electronic device using the encrypted communication channel.

8. The second electronic device of claim 7, wherein the first public key is generated by the first electronic device.

9. The second electronic device of claim 7, wherein the communication interface is further configured to obtain identification information of the first electronic device together with the first public key.

10. The second electronic device of claim 7, wherein
the second public key comprises a plurality of secret keys,
the communication interface is further configured to obtain at least one secret key selected by the first electronic device, and
the hardware processor is further configured to identify whether the obtained at least one secret key is comprised in the plurality of secret keys.

11. A non-transitory computer-readable recording medium having recorded thereon computer program instructions, which when executed by a processor of a first electronic device, controls the processor to:
control a communication interface of the first electronic device to transmit a first public key to a second electronic device;
obtain, from the second electronic device, a second public key encrypted using the transmitted first public key;
decrypt the encrypted second public key by using the first public key;
generate a secret key based on a first private key and the second public key;
obtain, from the second electronic device, an encrypted network key, wherein a network key is encrypted based on a secret key generated, at the second electronic device based on the first public key and a second private key;
decrypt the encrypted network key by using the secret key;
establish an encrypted communication channel between the first electronic device and the second electronic device by using the network key; and
control the communication interface to perform communication with the second electronic device by using the network key.

* * * * *